RADIOLOCATION SYSTEM TRANSMITTING SIDEBAND SIGNALS

Filed Oct. 5, 1964 2 Sheets-Sheet 1

Inventor
CHARLES W. EARP
By Percy P. Lantzy
Attorney

RADIOLOCATION SYSTEM TRANSMITTING SIDEBAND SIGNALS

Filed Oct. 5, 1964 2 Sheets-Sheet 2

RECEIVER

Inventor
CHARLES W. EARP
By Percy P. Lantzy
Attorney

United States Patent Office 3,339,202
Patented Aug. 29, 1967

3,339,202
RADIOLOCATION SYSTEM TRANSMITTING SIDEBAND SIGNALS

Charles William Earp, London, England, assignor to International Standard Electric Corporation, New York, N.Y., a corporation of Delaware Filed Oct. 5, 1964, Ser. No. 401,440
Claims priority, application Great Britain, Nov. 4, 1963, 43,410/63
11 Claims. (Cl. 343—105)

This invention relates to radio navigation systems for determining the position of a mobile station with respect to either one or more fixed beacon stations.

According to the invention there is provided a radio navigation system including a plurality of fixed stations each radiating a pair of sidebands of a common suppressed carrier wave, and a mobile station having means to generate a carrier wave representing the suppressed carrier wave and having means to extract information from the radiated pairs of sidebands.

The carrier source at the mobile station is used in a special demodulator to extract beat frequency components between the carrier and upper and lower sidebands independently. The beat frequency components are used to provide navigational information.

Embodiments of the invention applied to a rho-rho type radio navigation system and also to a hyperbolic radio navigation system will now be described with reference to the accompanying drawings in which.

Figure 1:
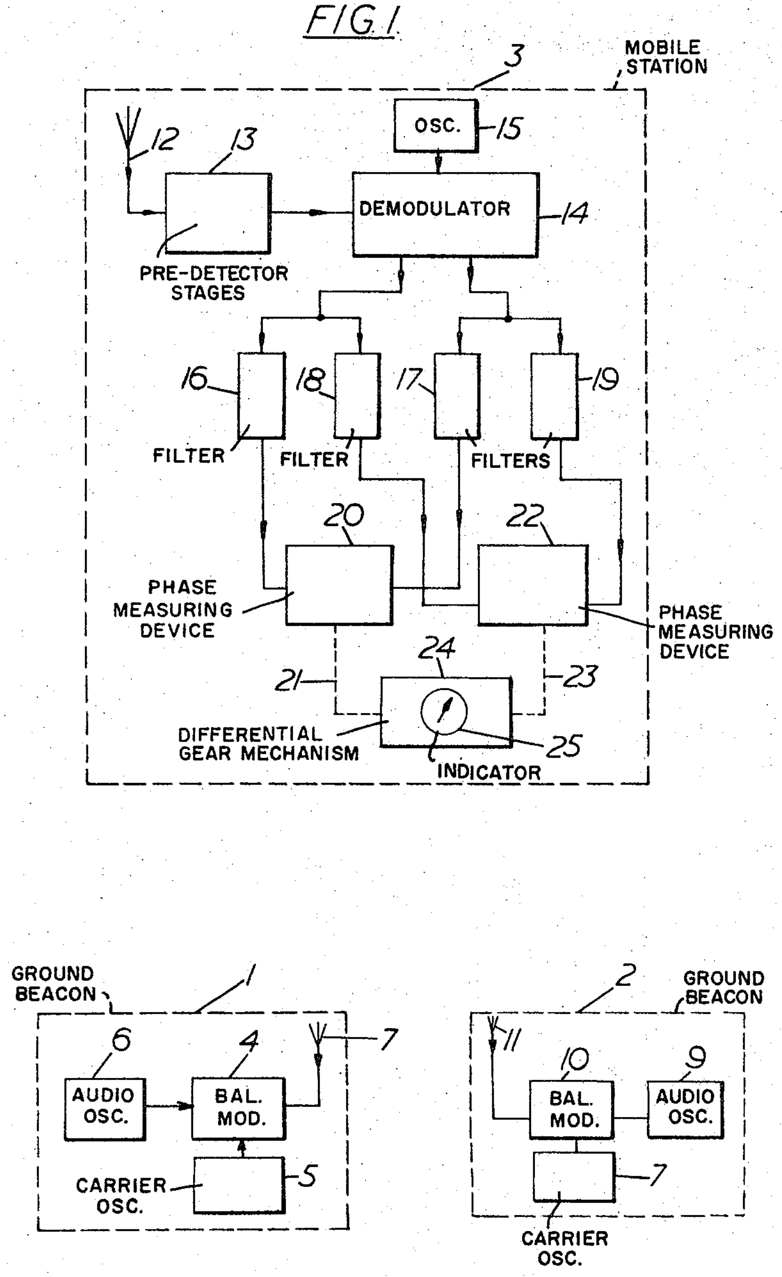
Figure 2:
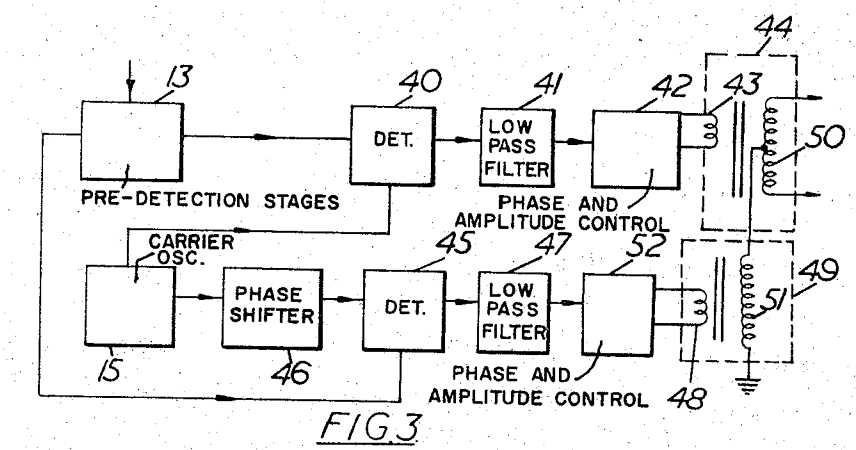
Figure 3:
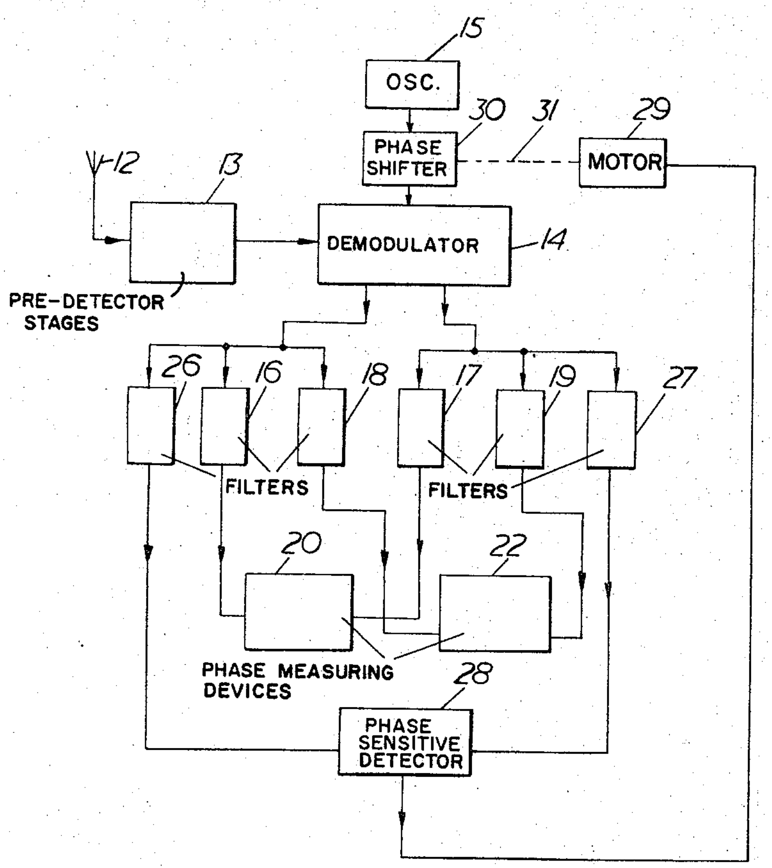

FIG. 1 shows a block schematic of transmitter and receiver arrangements at a fixed radio beacon and mobile station, respectively, FIG. 2 shows a block schematic diagram of a demodulator for use in the receiver arrangement shown in FIG. 1, and FIG. 3 shows a block schematic diagram of a preferred receiver arrangement.

Referring to FIG. 1 there are shown a ground beacon denoted by the dotted rectangle 1, and a mobile station denoted by the dotted rectangle 3, which in the embodiment being described is carried on an aircraft.

The ground beacon 1 includes a balanced modulator 4 in which a carrier wave at a frequency F, which is in the V.L.F. radio-frequency band and is generated by an oscillator 5 of very high frequency stability, is modulated by a low frequency audio wave at $f_1$ generated by an oscillator 6. The carrier wave is suppressed from the output of the modulator 4 which is connected to an antenna 7 from which the sidebands of the carrier wave at $F \pm f_1$ are radiated.

The receiving arrangement at the mobile station 3 includes a receiving antenna 12 and the pre-detector stages 13 capable of receiving the transmission at $F \pm f_1$.

The output signal from the pre-detector stages 13 of the receiver is fed to a special demodulator 14, which is described later, in which the received sidebands are demodulated with a second carrier wave generated by an oscillator 15. This second carrier wave is maintained as closely as possible to frequency F. Two output signals are present at the output of the demodulator 14, having a frequency $F_1$ and corresponding respectively to the sidebands $F \pm f_1$. The phase difference between the two signals at $f_1$ represents the phase displacement of the sideband vectors relative to the carrier. This phase displacement is proportional to the distance of the aircraft from the ground beacon.

The two output signals from the demodulator 14 at $f_1$ are selected by a pair of filters 16 and 17, tuned to $f_1$. It is essential that the carrier wave oscillator 15 on the aircraft has a very high stability so that its phase is always in the correct relationship with the phase of the carrier wave oscillator 5 at the ground beacon. The stability required will depend upon the accuracy required from the system, but in this embodiment of the invention the oscillator 15 is a crystal-controlled frequency standard having a frequency stability of a few parts in $10^{10}$ over the period flight of the aircraft.

The outputs of the filters 16 and 17 are coupled to the respective inputs of a phase measuring device 20 having an output shaft 21 which turns to a given angular setting dependent upon the phase angle between the input signals at $f_1$ applied to it.

The angular setting of the output shaft 21 is indicative of the distance of the aircraft from the beacon. The distance indications are repeated at distances which are multiples of $\lambda/2$, where $\lambda$ is the wavelength of the waves transmitted from the beacon. The system described so far is sufficient to enable the distance of the ground beacon from the aircraft to be determined. In order to provide such a distance-finding system having global coverage it would be necessary to provide a number of similar ground beacons. It would also be highly desirable to arrange that adjacent ground beacons radiate pairs of sidebands spaced from the same carrier wave by different audio frequencies in order to avoid the possibility of mutual cancellation of the received signal. One beacon, for example, may be arranged to radiate side-bands $\pm 15$ c./s. about a suppressed carrier wave of frequency 20,000 c./s., while another beacon radiates sidebands $\pm 25$ c./s. about the same carrier wave frequency.

In order to obtain a fix of the position of the aircraft it is again necessary to provide at least one other ground beacon, as shown within the dotted rectangle 2 in FIG. 1. The ground beacon 2 is similar to the beacon 1. The carrier wave oscillator, audio frequency oscillator and balanced modulator are represented by the rectangles 7, 9 and 10, respectively. The audio frequency oscillator 9 has a different frequency from that of the oscillator 6 at the beacon 1, and a pair of sidebands at $F \pm f_2$ are radiated from an antenna 11. The carrier and the two modulating waves F, $f_1$ and $f_2$ are at 20,000 c./s., 15 c./s. and 25 c./s., respectively, but other frequencies could be used. It is essential that the carrier wave oscillators 5 and 7 are always in a fixed phase relationship to one another to within very close limits. This requirement can be met by using an atomic-clock frequency standard at one ground station, and by synchronising other transmitters to it, as in the OMEGA or LORAN–C systems.

The signals from beacons 1 and 2 are received at the aircraft receiver 3 and are both demodulated in the detector 14 to produce two pairs of signals, one pair at $f_1$ and one pair at $f_2$. The signals at $f_1$ are selected by the filters 16 and 17 and are fed to the phase measuring device 20. The signals at $f_2$ are selected by filters 18 and 19 tuned to $f_2$, and are fed to a second phase measuring device 22. The indications of the devices 20 and 22 represent the distance of the aircraft from each of the ground beacons and therefore a fix of its position may be obtained.

The possibility of cancellation by wave interference of the signals received from the beacons does not arise because the signals have different frequencies.

In a modification of this embodiment of the invention a third beacon is provided on the ground.

The third ground beacon is in every way similar to the beacons 1 and 2, except that it radiates a pair of sidebands at $F \pm f_3$. At the output of the detector 14 in the airborne receiver 3 pairs of signals at frequencies $f_1$, $f_2$ and $f_3$ are obtained. The signals at $f_1$ and $f_2$ are selected by the filters 16 and 17, and 18 and 19, respectively and are fed to the phase measuring devices 20 and 22, respectively. The respective output shafts 21 and 23 of the phase measuring device 20 and 22 take up angular settings dependent upon the phase difference between the signals fed to the input of the devices and are mechanically coupled to a differential gear arrangement 24. An indicator 25 is coupled to the differential gear arrangement 24 and indicates the difference between the angular settings of the shafts 21 and 23, and hence gives an indication proportional to the differential phase displacement between the signals at $f_1$ and $f_2$. This arrangement provides a coverage in space in which the differential phase displacement between the pairs of signals at $f_1$ and $f_2$ recieved on imaginary hyperbolic lines having their foci at the positions of the ground beacons 1 and 2 is constant.

The signals at $f_3$ are selected by means of a third pair of filters and are fed to a third phase measuring device (not shown in FIG. 1) in exactly the same way as the signals at $f_1$ and $f_2$. The output shaft of the third phase measuring device is mechanically coupled to a second differential gear arrangement which is also coupled to the output shaft of one of the phase measuring devices 20 and 22. The second differential gear arrangement is provided with an indicator which indicates the differential phase displacement between the pairs of signals at either $f_3$ and $f_1$, or $f_3$ and $f_2$. The indications of the two indicators thus provide a fix of the position of the aircraft at the intersection of two hyperbolae.

Since the indication of the position of the aircraft is dependent upon the differential phase displacement between two pairs of sidebands, the stability requirement of the carrier wave oscillator carried in the aircraft may be relaxed considerably in the hyperbolic system as compared with the case where it is required to fix the position of the aircraft with respect to only two ground beacons.

Instead of measuring the difference between the outputs of the phase measuring devices by a differential gear arrangement, the differential phase displacement could be measured by feeding electrical outputs from the phase measuring devices to an electrical comparator.

A preferred form of the demodulator 14 will now be described with reference to FIG. 2. Referring to FIG. 2 there is shown the pre-detection stages 13 and the carrier wave oscillator 15 of the mobile station 3. The sideband signals from the pre-detector stages 13 and the carrier wave from the oscillator 15 are beaten together in an amplitude detector 40. The beat frequency components are selected by a low-pass filter 41 and after passing through a phase and amplitude network 42 are fed to the primary winding 43 of a transformer 44. A single beat frequency component of frequency, say, $f_1$ is obtained if the receiver is working with only one ground beacon. When working with two or more ground beacons beat frequency components at $f_1$ and $f_2$ or $f_1$, $f_2$, $f_3$, etc., are obtained.

The signals from the pre-detector stages are also fed to a further detector 45, and the carrier wave from the oscillator 15 is fed to the detector 45 after passing through a 90° phase-shift network 46. The phase shifted carrier wave and sideband signals are beaten together in the detector 45 and the beat frequency components are selected in a low-pass filter 47 and applied to the primary winding 48 of a second transformer 49, through a phase control network 52 which is complementary to the network 42. The complementary networks introduce a phase shift of 90° between the signals from the outputs of low-pass filters 41 and 47, respectively, over a range of frequencies $f_1$, $f_2$, $f_3$ corresponding to the pairs of sidebands radiated from the ground beacons in the system. The attenuation factors of the networks are also carefully matched.

The signals from the windings 43 and 48 are combined at the secondary winding 50 of the transformer 44 by connecting one side of a secondary winding 51 to the center point of the secondary winding 50, and returning the other side of the secondary winding 51 to earth.

Signals having frequencies of $f_1$, $f_2$ or $f_3$ are obtained at each of the terminals of the secondary winding 50. The signals at one of the secondary winding terminals correspond to the upper sideband signals (i.e., the beat between the carrier wave and the upper sideband signals) while those at the other correspond to the lower sideband signals (i.e., the beat between the carrier wave and the lower sideband signals), depending upon the sense of the connections to the transformers 44 and 49.

The demodulator depends for its correct action upon the fact that the carrier wave and sidebands are available from separate sources. The demodulator described in my co-pending United States application, Ser. No. 385,668, filed July 28, 1964, which is designed to operate when sidebands and carrier are not available separately, would actually be capable of providing the desired result also.

Referring to FIG. 3 which represents a block schematic of a preferred form of receiver arrangement, the apparatus represented by the blocks numbered up to 25 correspond to apparatus similarly numbered and described in connection with FIG. 1.

In FIG. 3 filters tuned to $f_3$ are represented by 26 and 27, the outputs of these filters being connected to the input terminals of a phase sensitive detector 28. A motor 29 is electrically coupled to the output of the detector 28 and the armature of the motor is mechanically coupled to the rotor of a variable phase-shifter 30 by means of a shaft 31. The output from the carrier wave oscillator 15 is coupled to the signal input terminals of the phase shifter 30, and the phase shifted signal from the phase shifter 30 is fed to the demodulator 14.

It is again assumed that there are three fixed ground beacons radiating pairs of sidebands $F \pm f_1$, $F \pm f_2$, and $F \pm f_3$, respectively.

The output from the carrier oscillator 15 at F is applied through the variable phase-shifter 30 to the demodulator 14 where it demodulates the signals received by the pre-detector stages 13.

The pair of filters 26 and 27 feed the phase sensitive detector 28, which controls the variable phase-shifter 30 to establish a predetermined phase relationship between the carrier at F and the sideband vectors at $F \pm f_3$.

Phase comparison of the signals at $f_1$ in the phase measuring device 20 yields a representation of the difference in distance of the receiver from the beacons radiating signals at $F \pm f_1$ and $F \pm f_3$, respectively. Similarly, phase comparison of the signals at $f_2$ in the phase measuring device 22 yields a representation of the differential distance of the receiver from the beacons radiating signals at $F \pm f_2$ and $F \pm f_3$, respectively.

In the embodiment of the invention described the sideband signals transmitted from the ground stations are produced by modulating a carrier wave in a balanced modulator. The sidebands could be produced by other means and could in fact consist of signals of stable frequency and phase from entirely separate sources.

Although in the embodiment of the invention described in this sepcification the receiver cooperating with the ground beacon has been assumed to be in an aircraft, the receiver could be placed in any other mobile craft or vehicle.

What I claim is:

1. A radio navigation system including a plurality of fixed radio beacons each arranged to radiate a pair of sidebands of a non-radiated carrier wave, and a mobile station to receive the said sidebands, the mobile station including a carrier wave generator to generate a carrier wave having a fixed phase relationship to each of the non-radiated carrier waves, a demodulator coupled to said carrier wave generator for demodulating the received pairs of sidebands to obtain a plurality of pairs of demodulated signals corresponding to the received pairs of sidebands and means coupled to said demodulation for measuring the phase difference between the signals of each pair, said phase difference being representative of the phase displacement of the sideband vectors relative to the carrier wave.

2. A radio navigation system as claimed in claim 1 including a plurality of pairs of filters coupled to said demodulator to separate the said pairs of demodulated signals from each other, and a plurality of phase measuring devices each coupled to the outputs of a respective one of the pairs of filters to measure the phase difference between the corresponding pair of demodulated signals.

3. A radio navigation system as claimed in claim 2 wherein the said demodulator includes two amplitude detectors in which the received pairs of sidebands are beaten with the carrier wave, a signal feed arrangement to feed the carrier wave to the two amplitude detectors with a mutual phase relationship of substantially 90 degrees, two filters to select the beat frequency components from the output signals of the amplitude detectors, two complementary phase control networks to maintain a phase difference of substantially 90 degrees between the said beat frequency components from the outputs of the respective amplitude detectors, circuit means to split each of the beat frequency components from one of the amplitude detectors into two anti-phased components and to combine the said anti-phased components with the beat frequency components having a phase difference of substantially 90 degrees with respect to the said anti-phased components.

4. A radio navigation system as claimed in claim 3 wherein the output of each of the complementary phase control networks is coupled to the primary winding of a respective one of two transformers, the secondary winding of one of the transformers having a center tap connected to one terminal of the secondary winding of the other transformer, and the individual filters of each pair of the said plurality of pairs of filters are coupled to respective ones of the terminals of the secondary winding of the said one of the transformers.

5. A radio navigation system as claimed in claim 2 including at least three fixed radio beacons and at the mobile station a differential indicator arrangement responsive to the difference between the measurements of two of the phase measuring devices and a differential indicator arrangement responsive to the difference between the measurements of one of the said two phase measuring devices and a third phase measuring device.

6. A radio navigation system as claimed in claim 5 wherein the differential indicator arrangements are constitued by indicators each coupled to a differential gear mechanically coupled to the respective output shafts of a respective pair of the phase measuring devices.

7. A radio navigation system as claimed in claim 2 including at least three fixed radio beacons, and at the mobile station a phase detector connected to the output of one of the said pairs of filters, and a variable phase shifter responsive to the output from the phase detector and connected between the output of the carrier wave generator and the demodulator.

8. A radio navigation system including a plurality of fixed stations, each radiating a pair of sidebands of a non-radiated carrier wave, the pairs of sidebands having different frequencies from each other and the non-radiated carrier waves having a fixed phase relationship to each other, and a mobile receiving station to receive said sidebands, said mobile receiving station having means to locally generate a carrier wave, means coupled to said carrier wave generator to control the phase relationship between said locally generated carrier wave and the non-radiated carrier waves and means coupled to said generating means for demodulating the received waves.

9. A radio navigation system according to claim 8 further comprising means coupling said phase control means to the output of said demodulating means.

10. A radio navigation system including a plurality of fixed stations, each radiating a pair of sidebands of a non-radiated carrier wave, the pairs of sidebands having different frequencies from each other and the non-radiated carrier waves having a fixed phase relationship to each other, and a mobile receiving station to receive said sidebands, said mobile receiving station having generating means to locally generate a carrier wave representing the non-radiated carrier waves, means coupled to said generating means to control the phase relationship between said locally generated carrier wave and the non-radiated carrier waves, demodulating means coupled to said generating means for demodulating the received waves to obtain a plurality of pairs of demodulated signals corresponding to the received pairs of sidebands and means coupled to said demodulating means for measuring the phase difference between the signals of each pair of sidebands, said phase difference being representative of the phase displacement of the sideband vectors relative to the carrier wave.

11. A radio navigation system mobile station as claimed in claim 10 including a plurality of pairs of filters coupled to said demodulator to separate the said pairs of demodulated signals from each other, and a plurality of pairs of phase measuring devices each coupled to a respective one of the pairs of filters to measure the phase difference between the corresponding pair of demodulated signals.

References Cited

UNITED STATES PATENTS

| | | | |
|---|---|---|---|
| 3,150,372 | 9/1964 | Groth | 343—112.3 |
| 3,171,127 | 2/1965 | Asteraki et al. | 343—112.3 |
| 3,242,492 | 3/1966 | Honore et al. | 343—112.3 |

FOREIGN PATENTS

| | | |
|---|---|---|
| 683,688 | 12/1952 | Great Britain. |

RODNEY D. BENNETT, *Primary Examiner.*

CHESTER L. JUSTUS, *Examiner.*

H. C. WAMSLEY, *Assistant Examiner.*